United States Patent [19]
Sugao

[11] Patent Number: 4,832,376
[45] Date of Patent: May 23, 1989

[54] CONNECTION STRUCTURE FOR BRANCH PIPE IN HIGH-PRESSURE FUEL MANIFOLD

[75] Inventor: Keizo Sugao, Shuzenji, Japan

[73] Assignee: Usui Kokusai Sangyo Kaisha Ltd., Nagasawa, Japan

[21] Appl. No.: 197,115

[22] Filed: May 20, 1988

[30] Foreign Application Priority Data

May 23, 1987 [JP] Japan .................. 62-78010[U]

[51] Int. Cl.$^4$ .......................................... F16L 41/04
[52] U.S. Cl. ............................... 285/158; 285/156; 285/197
[58] Field of Search ............ 285/156, 158, 197, 332.3, 285/353

[56] References Cited

U.S. PATENT DOCUMENTS

| Re. 6,488 | 6/1875 | Van Duzer ................. 285/156 |
| 150,109 | 4/1874 | Van Duzer ................. 285/156 |
| 966,870 | 8/1910 | Stoddard . | |
| 2,781,500 | 2/1957 | Armstrong ............... 285/158 X |
| 3,104,121 | 9/1963 | Nordin et al. ............ 285/332.3 |
| 3,783,842 | 1/1974 | Kuhn et al. . | |
| 4,073,513 | 2/1978 | Blakely .................. 285/158 X |
| 4,448,447 | 5/1984 | Funk et al. ............. 285/158 X |
| 4,540,205 | 9/1985 | Watanabe et al. . | |

FOREIGN PATENT DOCUMENTS

| 1811684 | 6/1970 | Fed. Rep. of Germany ...... 285/158 |
| 7801062 | 5/1987 | Japan . |
| 214979 | 8/1941 | Switzerland ..................... 285/158 |

*Primary Examiner*—Peter R. Brown
*Attorney, Agent, or Firm*—Anthony J. Casella; Gerald E. Hespos

[57] ABSTRACT

A connection structure for branch pipes in a high-pressure fuel manifold, comprising a plurality of through holes formed in the longitudinal direction in the peripheral wall of a main pipe serving to pass a high-pressure fuel and adapted to communicate with an inner flow passage and branch pipes abutted against the through holes, is prevented from the possibility of entailing leakage of fuel through the portions of connection or separation of the branch pipes from the main pipe by shaping the inner terminal peripheries of the through holes each in the form of an outwardly opening bearing surface, fixing joint pieces on the peripheral wall of the main pipe in such a manner as to enclose the bearing surfaces, allowing pressure head portions formed in advance on the connection terminal parts of the branch pipes as matched to the bearing surfaces to be held in tight contact with the bearing surfaces, and causing nuts incorporated in advance in the branch pipes to be helically engaged with threaded holes formed in the joint pieces.

9 Claims, 2 Drawing Sheets

CONNECTION STRUCTURE FOR BRANCH PIPE IN HIGH-PRESSURE FUEL MANIFOLD

BACKGROUND OF THE INVENTION

1. Field of the Invention

Generally in the internal combustion diesel engine for a varying vehicle, this invention relates to improvements in and concerning the connection structure for a branch pipe in a high-pressure manifold, particularly a manifold for handling a fuel under an ultra-high pressure exceeding 1,000 kg/cm$^3$, which is disposed near the engine as a path for supply of the fuel to the engine.

2. Description of the Prior Art

In recent years, a connection structure which, as illustrated in FIG. 3, for example, comprises a plurality of through holes (13) which are formed as arranged in the longitudinal direction in the peripheral wall of a main pipe (11) serving to pass a high-pressure fuel and adapted to communicate with inner flow paths (12) and branch pipes (14) which are inserted one each into the through holes (13) and joined thereto by means of soldering or welding (W) has been trially put to use.

In the connection structure of this nature, however, the welded portions (W) are liable to be embrittled possibly to the extent of entailing the phenomenon of fuel leakage or the separation of branch pipes (14) from the main pipe (11) because the portions involved in the mutual insertion mentioned above fail to offer strength necessary for stable connection and the union of these portions by welding often suffers from poor workmanship and because these portions by nature are exposed to repeated application of an ultra-high fluid pressure frequently exceeding 1,000 kg/cm$^3$ owing to the improvement in the engine construction and to incessant exertion of vibrations generated by the engine.

SUMMARY OF THE INVENTION

An object of this invention is to provide a connection structure which enables branch pipes to be connected easily to the relevant portions of a main pipe without requiring any welding work, permits the branch pipes to withstand fully the ultra-high fluid pressure even in a state exposed to incessant vibrations, and precludes the possibility of entailing the fuel leakage through the portions of connection or the separation of branch pipes from the main pipe.

In the connection structure comprising a plurality of through holes which are formed as arranged in the longitudinal direction in the peripheral wall of a main pipe serving to pass a high-pressure fuel and adapted to communicate with inner flow paths and branch pipes which are abutted one each against the through holes, the present invention is directed to the connection structure for branch pipes in a high-pressure fuel manifold, which connection structure is produced by shaping the inner terminal peripheries of the through holes each in the form of an outwardly opening pressure-receiving bearing surface, fixing separately produced joint pieces as by welding on the peripheral wall of the main pipe so as to enclose severally the bearing surfaces, causing pressure head portions formed at the connection terminals of the branch pipes to be pressed into tight contact with the bearing surfaces, and allowing nuts incorporated one each in the branch pipes to be tightly meshed with threaded holes in the joint pieces. This invention contemplates shaping the joint pieces each in the form of a circular ring or an angular ring of a small length, the bearing surfaces each in the form of a cone or an arc, and the pressure head portions each in the form of a truncated cone or arc.

Owing to the construction described above, the present invention is capable of producing a connection structure for branch pipes in a manifold serving to pass a fluid under an ultra-high pressure even exceeding 1,000 kg/cm$^2$ by enabling the pressure head portions of the branch pipes to be pressed tightly against the bearing surfaces by means of the joint pieces fixed as by welding to the peripheral wall of the main pipe and then allowing the abutting surfaces to be immobilized against each other by the fast union of nuts and screws.

DETAILED DESCRIPTION OF PREFERRED EMBODIMENTS

Figure 1:
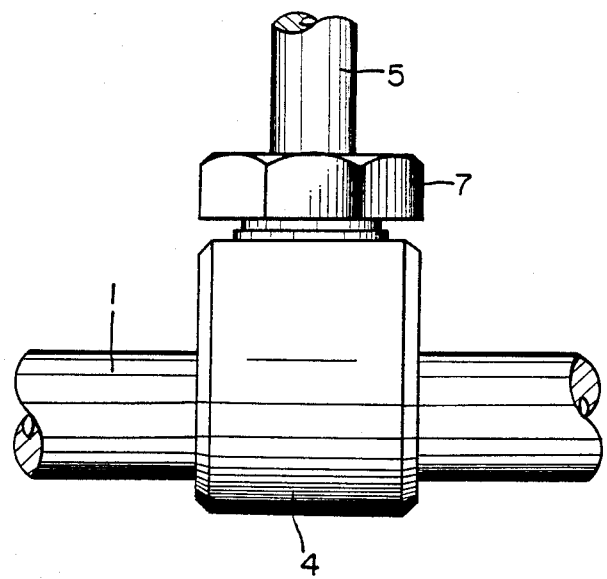
FIG. 1 is a lateral view of a connection structure for branch pipes in a high-pressure fuel manifold as one embodiment of the present invention.
Figure 2:
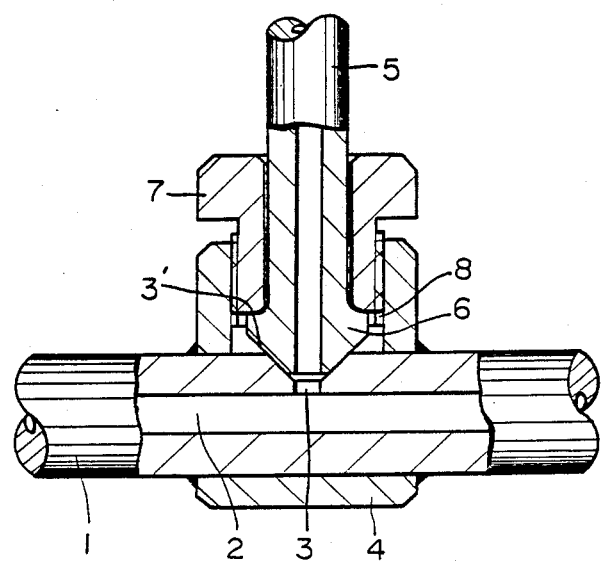
FIG. 2 is a longitudinal cross section taken partly through FIG. 1.
Figure 3:
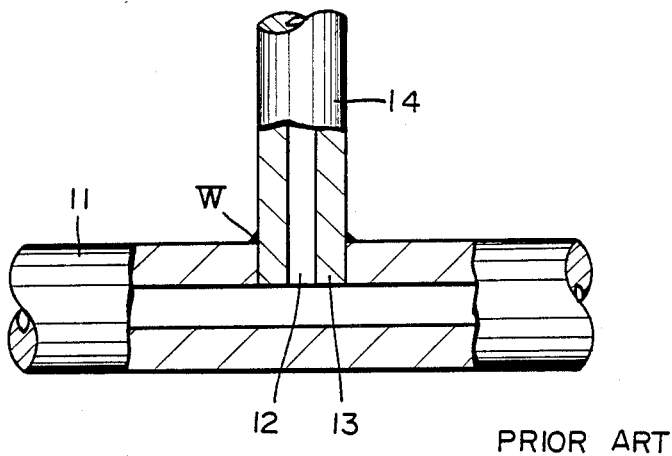
FIG. 3 is a partially longitudinal cross section illustrating a connection structure of prior art.

In FIG. 1 and FIG. 2, a main pipe (1) is made of metal with a rather small outside diameter of approximately 20 mm and a rather large wall thickness of approximately 6 mm to define a small diameter through passage (2) of approximately 8 mm. In the peripheral wall of the main pipe (1), a plurality of through holes (3) communicate with the through passage (2). The through holes (3) have the respective inner terminal peripheries thereof each shaped in the form of an outwardly opening conical or curved bearing surface (3') and are disposed and arranged along the longitudinal direction of the main pipe (2). A joint piece (4) is separately produced in the form of a circular ring or angular ring of a small length adapted to be fitted or, if desired, fixed as by welding on the peripheral wall of the main pipe (1) so as to enclose one of the bearing surfaces (3'). The branch pipes (5) and the main pipe are joined by causing truncated conical or arcuately curved pressure head portions (6) formed at the connection terminal parts of the branch pipes (5) to be pressed tightly against the bearing surfaces (3') by means of the joint pieces and allowing the abutting surfaces to be immobilized against each other by means of fast engagement between nuts (7) incorporated in the branch pipes and threaded holes (8) formed in the inner wall surfaces of the joint pieces (4).

Figure 2A:
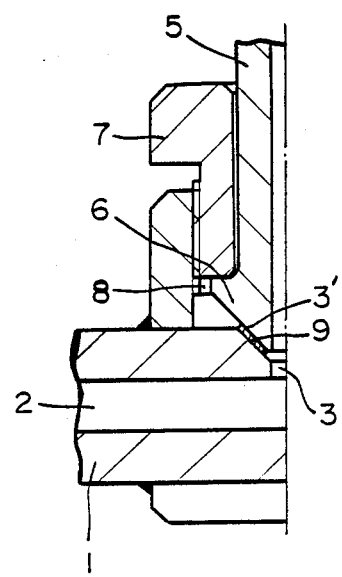
FIG. 2A is a magnified cross section illustrating another embodiment of this invention.

Optionally, sealing members (9) such as copper packings may be interposed between the pressure head portions (6) and the bearing surfaces (3') as shown in FIG. 2A.

As described above, the connection structure of the present invention obviates the necessity for effecting any work of soldering or welding in the portions for connecting the branch pipes (5) to the main pipe (1) because this connection of the branch pipes (5) is attained easily be fast helical engagement of the nuts (7) formed in the joint pieces (4) fixed on the main pipe (1). Further, the joint pieces (4) which are fixed with their fitting holes held fast in tight contact with the entire circumference of the peripheral wall of the main pipe (1) are capable of fully withstanding the ultra-high fluid pressure even in a state exposed to incessant vibrations generated by the engine and, at the same time, precluding the possibility of entailing fluid leakage through portions of connection or separation of the branch pipes (5) from the main pipe (1). This invention, therefore provides a highly useful connection structure.

What is claimed is:

1. A connecting structure for a branch pipe in a high-pressure fuel manifold, comprising:

a main pipe having a peripheral wall and a longitudinally extending through passage, at least one through hole extending through the peripheral wall and into the longitudinal through passage of the main pipe, said through hole in said peripheral wall defining an outwardly opening bearing surface;

a fixing joint piece for each said at least one through hole, said fixing joint piece defining a generally annular ring disposed over the peripheral wall of said main pipe and having a laterally extending threaded hole, said fixing joint piece being secured to said main pipe such that the laterally extending threaded hole surrounds the bearing surface of the through hole in the main pipe;

a branch pipe for each said at least one through hole in said main pipe, said branch pipe having a pressure head portion with a terminal end conforming to and abutting against the bearing surface of the through hole; and a nut mounted about each said branch pipe and engaging the pressure head portion thereof, said nut comprising an array of threads securely engaging the threaded hole of the fixing joint piece and tightly holding the terminal end of the branch pipe in abutting engagement with the bearing surface of the through hole of said main pipe.

2. The connection structure according to claim 1, wherein said joint pieces are fixed by welding to said main pipe.

3. The connection structure according to claim 1, wherein said bearing surfaces of said through holes are each in the form of a cone or an arc.

4. The connection structure according to claim 1, wherein said pressure head portions are each in the form of a truncated cone or arc.

5. The connection structure according to claim 1, wherein sealing members are interposed between said pressure head portions and said bearing surfaces.

6. The connection structure according to claim 5, wherein said sealing members are copper packings.

7. The connection structure according to claim 1, wherein said main pipe has an outside diameter of approximately 20 mm and a wall thickness of approximately 6 mm.

8. A connecting structure according to claim 1 wherein the pressure head portion of said branch pipe defines a generally annular nut engaging shoulder generally opposed to the terminal end of said pressure head portion, said nut engaging the annular nut engaging shoulder of said pressure head portion for urging the terminal end of said pressure head portion into abutting engagement with the bearing surface of the through hole of said main pipe.

9. A connecting structure according to claim 1 wherein the fixing joint piece is secured to the main pipe by welding.

* * * * *